J. MICHELS.
Hoop Sawing and Finishing Machine.
No. 222,297. Patented Dec. 2, 1879.
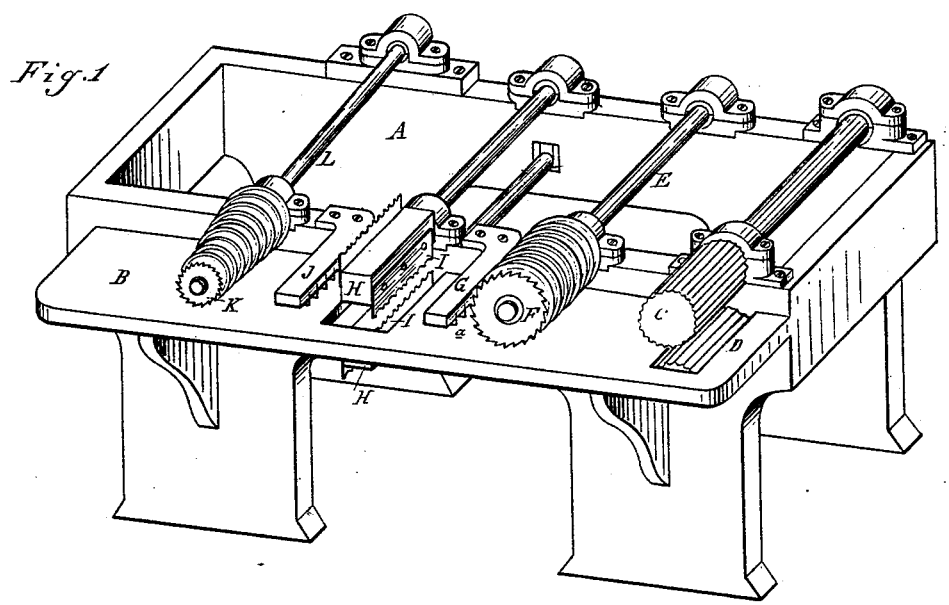
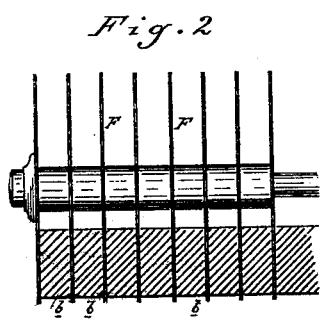
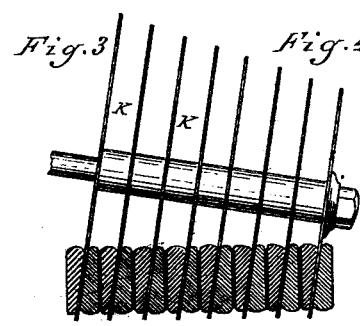
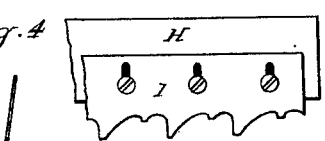
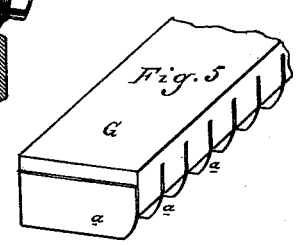

UNITED STATES PATENT OFFICE.

JACOB MICHELS, OF DETROIT, ASSIGNOR TO CHARLES E. CHITTENDEN, OF ECORSE, AND MOSES W. FIELD, OF DETROIT, MICHIGAN, ONE-FOURTH TO EACH.

IMPROVEMENT IN HOOP SAWING AND FINISHING MACHINES.

Specification forming part of Letters Patent No. 222,297, dated December 2, 1879; application filed February 4, 1879.

*To all whom it may concern:*

Be it known that I, JACOB MICHELS, of Detroit, in the county of Wayne and State of Michigan, have invented an Improvement in Hoop Sawing and Finishing Machines, of which the following is a specification.

The nature of my invention relates to new and novel and useful improvements in the construction of machines for sawing hoops from planks of the proper thickness, and re-sawing the cants diagonally into beveled hoops, each cant making two hoops, and rounding off and finishing the edges of the hoops thus made, the parts being so arranged that the whole formation of the hoops is completed with one handling and at one passage through the machine.

To this end invention consists in the peculiar construction and arrangement of the various parts, as more fully hereinafter described.

In the accompanying drawings, which form a part of this specification, Figure 1 is a perspective view of my improved machine. Fig. 2 is a vertical central section through the center of the horizontal saw-arbor and its series of circular saws, showing the method of sawing the plank into rectangular strips or cants. Fig. 3 is a like view of the inclined saw-arbor with its saws, showing the method of sawing the rectangular strips or cants into beveled hoops. Fig. 4 is a plan or elevation of the rotating head and tool by means of which the edges of the hoops are rounded or finished. Fig. 5 is a detached perspective of the presser-bar and its spurs, by means of which the strips or cants are held to the face of the table.

A represents the frame which sustains the operating parts of the machine, and it is provided with a table, B. Corrugated feed-rolls C D are journaled to the frame, the former above the table and the latter below the same, but so as to present its highest point through an opening prepared in the table therefor.

E is an arbor, suitably journaled, carrying a series of circular saws, F, secured at such distances apart as will saw a plank into cants or slats of suitable width to make, when re-sawed, two hoops.

G is a presser-bar, secured to the frame and projecting therefrom at right angles over the table B at just sufficient distance above to allow the plank being operated upon to pass between said bar and the face of the table to prevent said plank from any vertical play. This bar has downwardly-projecting spurs or parting-strips $a$, rigidly secured at distances equal to the distances between the saws F, and so arranged that the spurs and saws are coincident. These parting-strips enter the kerf made by the saws in sawing the plank into slats $b$ or cants, and hold said cants in lateral place, the outside spur overhanging the outer edge of the outer slat.

As the plank is fed forward by the feed-rolls it passes between two rotating and suitably-journaled cutter-heads, H, which are provided with cutters I, generally of the form shown in Fig. 4, and these cut two beads on each upper and lower edge of each slat or cant, care being taken in setting the cutters that the upper edge is cut with a wider and a narrower bead, while the lower edge is cut with a narrower and wider bead—that is to say, the wider bead above is opposite the narrower bead below, and the narrower bead above opposite the wider bead below, as shown in Fig. 3. In its advance the sawed and divided end of the plank is next presented to another presser-bar, J, constructed and operating precisely like the presser-bar G, above described, and which is placed at this point to confine the cants for the last operation. This is done by means of circular saws K upon the arbor L, so journaled upon an incline that the saws are presented diagonally to the advancing rectangular ends of the slats or cants. By this arrangement the cants are cut diagonally from top to bottom, and each one divided into two finished hoops with rounded edges, as shown in cross-section in Fig. 3.

The saws upon the inclined arbor, in order to leave the outer or bevel sides of the hoops smooth, should be so constructed that the points of the teeth will rip the cants in two. The sides of said teeth should plane and smooth the sides of the hoops.

What I claim as my invention is—

1. The combination, in a hoop-cutting machine, of upright saws for cutting a plank into rectangular strips, inclined saws for dividing each of said strips into two beveled hoop-strips, and cutters for rounding both edges of su strips, substantially as described.

2. In combination, in a hoop-sawing machine, a series of vertical circular saws, a pair of rotary cutters, and a series of diagonally-placed circular saws adapted to saw a plank into cants, cut two beads upon the upper and lower edges thereof, and resaw the same into bevel hoops, substantially as specified.

3. In a hoop-cutting machine, the combination, with the upright and inclined circular saws, for first cutting a plank into rectangular strips and then into beveled hoop-strips, and cutters for rounding both edges of such strips, of pressure-bars G J having pendent plate $a$ to separate and guide the strips, substantially as described and shown.

JACOB MICHELS.

Witnesses:
H. S. SPRAGUE,
CHARLES J. HUNT.